US009882425B1

(12) United States Patent
Flegel (10) Patent No.: US 9,882,425 B1
(45) Date of Patent: Jan. 30, 2018

(54) MULTI-CIRCUIT SWITCHING DEVICE (71) Applicant: Reliance Controls Corporation, Racine, WI (US)

(72) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 945 days.

(21) Appl. No.: 14/202,847

(22) Filed: Mar. 10, 2014

Related U.S. Application Data (60) Provisional application No. 61/794,475, filed on Mar. 15, 2013.

(51) Int. Cl.
| | | |
|---|---|---|
| H02J 7/00 | (2006.01) |
| H02J 9/06 | (2006.01) |
| H02J 3/00 | (2006.01) |
| H02J 9/00 | (2006.01) |
| H02J 9/04 | (2006.01) |
| H01H 73/00 | (2006.01) |

(52) U.S. Cl.
CPC ............ *H02J 9/066* (2013.01); *H01H 73/00* (2013.01); *H02J 3/005* (2013.01); *H02J 9/00* (2013.01); *H02J 9/04* (2013.01); *H02J 9/06* (2013.01)

(58) Field of Classification Search
CPC ........ H02J 9/06; H02J 9/00; H02J 9/04; H02J 9/066; H01H 73/00
USPC .................. 307/112, 64, 113; 361/622, 634; 200/50.37; 335/202, 6, 8, 11
See application file for complete search history.

(56) References Cited

U.S. PATENT DOCUMENTS

| | | | |
|---|---|---|---|
| 5,648,646 A * | 7/1997 | Flegel | H01H 9/26 200/50.32 |
| 6,031,193 A | 2/2000 | Flegel | |
| 6,052,046 A * | 4/2000 | Ennis | H01H 71/025 335/11 |
| 6,570,269 B2 | 5/2003 | McMillian et al. | |
| 6,791,211 B1 | 9/2004 | Flegel | |
| 7,462,791 B1 | 12/2008 | Flegel | |
| 7,531,762 B2 | 5/2009 | Flegel | |
| 7,602,083 B1 | 10/2009 | Flegel et al. | |
| 7,834,486 B1 | 11/2010 | Flegel et al. | |
| 7,888,821 B2 | 2/2011 | Flegel et al. | |
| 8,030,799 B1 * | 10/2011 | Flegel | H01H 89/06 307/125 |
| 8,040,663 B1 | 10/2011 | Czarnecki | |
| 8,110,759 B2 | 2/2012 | Flegel | |
| 8,138,433 B2 | 3/2012 | Czarnecki et al. | |
| 8,471,659 B1 | 6/2013 | Flegel | |

(Continued)

*Primary Examiner* — Arnold Kinkead
(74) *Attorney, Agent, or Firm* — Boyle Fredrickson, S.C.

(57) ABSTRACT

A switching device includes multiple switches configured to selectively connect one of two power sources to electrical loads. The switching device may include either single-pole or double-pole, double-throw switches and corresponding single or double circuit breakers. The single and double circuit breakers are each configured to be inserted into openings having the same physical dimensions. At least one of the switches is a double-pole, double-throw switch, allowing two branch circuits to be transferred between power sources via the switch. A double breaker corresponding to the double-pole, double-throw transfer switch permits each of the branch circuits being switched by the double-throw switch to be wired through a separate protective circuit.

23 Claims, 3 Drawing Sheets

(56) References Cited

U.S. PATENT DOCUMENTS

| | | |
|---|---|---|
| 8,723,361 B2 | 5/2014 | Flegel |
| 2009/0058191 A1* | 3/2009 | Nordman .................. H02G 3/08 307/112 |
| 2011/0100787 A1* | 5/2011 | Czarnecki ................ H01H 9/26 200/50.37 |
| 2013/0070394 A1* | 3/2013 | Batzler .................. H02J 3/005 361/624 |

* cited by examiner

MULTI-CIRCUIT SWITCHING DEVICE

CROSS-REFERENCE TO RELATED APPLICATIONS

This application claims priority to U.S. provisional application Ser. No. 61/794,475, filed Mar. 15, 2013, the entire contents of which is incorporated herein by reference.

BACKGROUND OF THE INVENTION

The subject matter disclosed herein relates to a switching device configured to switch multiple electrical circuits between two power sources, and more specifically, to a switching device including a double pole, double throw switch operatively connected with a double circuit breaker to selectively connect one of two power sources to electrical loads.

Figure 1:
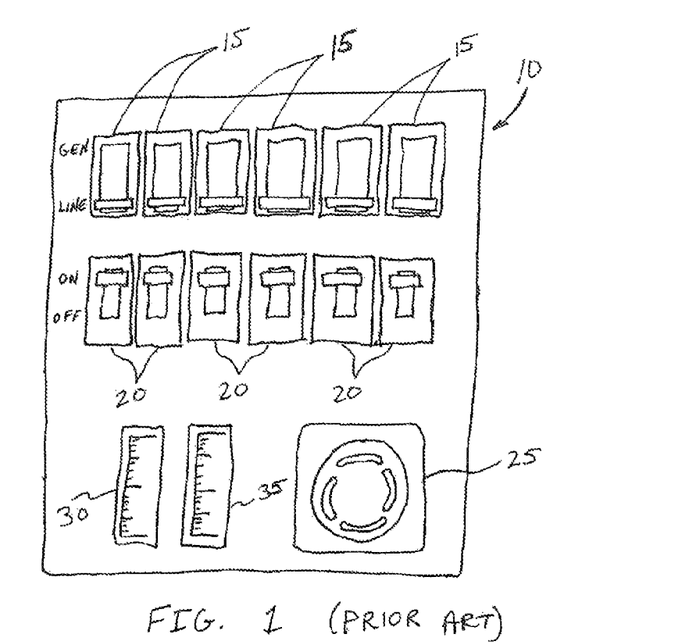
FIG. 1 is a block diagram representation of a prior art switching device.

It is known that utility power lines are exposed to harsh environmental conditions and can become inoperable for many reasons, such as inclement weather, ice, falling trees, or animal damage, which may cause a portion of the power grid to fail or blackout. Consequently, many utility power customers install a backup generator to power some or all of the electrical loads present at the residence or business in the event utility power becomes unavailable. The utility power customer may also install a transfer switch which allows one or more loads to be alternately connected with one of the two power sources according to the position of the switch. Referring to FIG. 1, the utility power customer may install a switching device 10 which includes multiple transfer switches 15, where each transfer switch 15 is configured to selectively connect one branch circuit from a load center either to the utility power or to the generator. A circuit breaker 20 is connected between the generator and the load for each of the switched circuits, replacing the circuit breaker in the load center when the load is connected to the generator. The switching device 10 may include a receptacle 25 configured to receive a power cord from the generator. Optionally, the generator may be hard-wired to the switching device 10. The switching device 10 may also include watt meters 30, 35 which provide a visual indication of the amount of power being drawn by the loads.

Historically, it has been known to select a switching device 10 that includes a sufficient number of transfer switches 15 to provide backup power to selected critical circuits within a building, such as a dwelling. A critical circuit may include, for example, a furnace, hot water heater, sump pump, refrigerator, etc. As the number of electronic devices and electric circuits within a dwelling continue to increase, however, the utility power customer may have an increasing number of critical circuits, including, for example, medical equipment, a backup sump pump, and lights in one or more areas of the dwelling. Further, the utility power customer may desire the backup generator to power additional circuits such as an oven, television, or computer. As a result, the number of transfer switches 15 and corresponding circuit breakers 20 required within the switching device 10 continues to increase. The increased number of transfer switches 15 and circuit breakers 20 result in a corresponding increase in the space required to install the switching device 10. Thus, it would be desirable to provide a switching device configured to transfer an increased number of circuits within the same or in a smaller space than a conventional switching device 10.

Additionally, it is common for a utility power customer to add circuits subsequent to initial construction, for example, during a remodel or an expansion of the dwelling. The utility power customer may desire that a portion of the additional circuits be added to the switching device 10 such that they may also be powered by the backup generator in the event of a power failure. However, because the switching device 10 typically provides backup power to a smaller number of circuits via the generator than are powered via the utility grid, all of the transfer switches 15 typically are already connected to circuits. As a result, the utility power customer must either remove an existing circuit or install a larger switching device 10 to add the new circuit. Thus, it would be desirable to provide a switching device 10 that is expandable to allow additional circuits to be easily added for connection to the backup generator.

BRIEF DESCRIPTION OF THE INVENTION

The subject matter disclosed herein relates to a switching device configured to selectively connect one of two power sources to electrical loads. According to one embodiment of the invention, a first power source is the utility grid and a second power source is a backup generator. The electrical loads are primarily powered from the utility grid. During periods in which the utility grid is unavailable, the generator is started and supplies power to the electrical loads. A main power feed from the utility grid enters a load center and is distributed to a number of branch circuits. Each of the branch circuits includes a circuit breaker in the load center through which power is provided to the respective electrical loads connected to that branch circuit. A portion of these branch circuits are also connected to the switching device. Transfer switches are provided for each of the branch circuits connected to the switching device such that the branch circuit may be disconnected from the utility grid and connected to the generator. A separate circuit breaker is provided within the switching device for each of the branch circuits connected through a transfer switch.

The switching device includes at least one double-pole, double-throw transfer switch, allowing two branch circuits to be transferred between power sources via the switch and further includes a double breaker corresponding to the double-pole, double-throw transfer switch. The double breaker permits each of the branch circuits being switched by the double-throw switch to be wired through a separate protective circuit. The combination of the double-pole, double-throw switch and double breaker provides for two branch circuits to be transferred between the utility source and the generator in the same physical space as previously used to switch a single branch circuit.

The switching device may also include at least one double-pole, double-throw transfer switch, through which a single branch circuit is transferred between power sources. A single breaker is associated with the switch to provide a protective circuit for the branch circuit. In addition, wiring is provided within the switching device such that an additional branch circuit may be readily accommodated. The double-pole, double-throw transfer switch may have wiring connected such that a second branch circuit is connectable to the switch. In addition, wires may be provided for connection to a second protective circuit such that the single breaker may be removed and a double breaker inserted. As a result of the initially unused throw on the one or more double-throw switches and of the additional wiring provided, the switching device allows one or more additional circuits to be easily added for connection to the backup generator.

According to one embodiment of the invention, a switching device for selectively connecting a plurality of load circuits between a first power source and a second power source is disclosed. The switching device includes at least one double pole, double throw switch and at least one double breaker. Each throw of the double pole, double throw switch selectively connects one of the load circuits with the first power source in a first position and with the second power source in a second position. Each double breaker corresponds to one of the double pole, double throw switches and includes a first protective circuit and a second protective circuit. Each protective circuit is configured to operate independently of the other protective circuit and is configured to open if a current conducted through the protective circuit exceeds a predefined amplitude. The double breaker is sized to fit within an opening configured to receive either a single breaker or the double breaker.

According to another embodiment of the invention, a switching device includes a first input configured to be electrically connected to a first power source, a second input configured to be electrically connected to a second power source, and a plurality of outputs. Each output is configured to be electrically connected to an electrical load. The switching device also includes a plurality of double-pole, double-throw switches and a plurality of circuit breakers. A first pole for each throw of the of double-pole, double-throw switch is electrically connected to the first input, a second pole for each throw is electrically connected to the second input, and each throw is electrically connected to one of the plurality of outputs. Each of the circuit breakers corresponds to one of the plurality of double-pole, double-throw switches, and each circuit breaker includes a first terminal electrically connected to the second power source, a second terminal electrically connected to the second pole for a first throw of the corresponding double-pole, double-throw switch, a third terminal electrically connected to the second pole for a second throw of the corresponding double-pole, double-throw switch, a first protective circuit electrically connected in series between the first terminal and the second terminal, and a second protective circuit electrically connected in series between the first terminal and the third terminal. The circuit breaker may also include a manual reset for each of the protective circuits, and the manual reset may be externally activated to close a protective circuit.

According to yet another embodiment of the invention, a system for providing power to an electrical load during a failure of a utility grid is disclosed. The system includes a housing including multiple first and second openings. Each of the first openings has a uniform periphery and is configured to receive either a single-pole, double-throw switch or a double-pole, double-throw switch. Each of the second openings has a uniform periphery and is configured to receive either a single circuit breaker or a double circuit breaker. The system also includes a first input configured to be connected to the utility grid, a second input configured to be connected to another power source, such as a backup generator, and a plurality of outputs. Each output is configured to be connected to an electrical load. The system further includes double-pole, double-throw switches and double circuit breakers. Each of the double-pole, double-throw switches is received within one of the first openings and is configured to selectively establish a first electrical connection between either the first input or the second input and one of the plurality of outputs via a first throw, and to selectively establish a second electrical connection between either the first input and the second input and one of the plurality of outputs via a second throw. Each double circuit breaker corresponds to one of the plurality of double-pole, double-throw switches. Each of the double circuit breakers is received within one of the plurality of second openings and includes a first protective circuit electrically connected between the second input and the first throw of the corresponding double-pole, double-throw switch and a second protective circuit electrically connected between the second input and the second throw of the corresponding double-pole, double-throw switch.

According to another aspect of the invention, the system includes a linking bar mechanically coupled between a first switch arm of a first of the double-pole, double-throw switches and a second switch arm of a second of the double-pole, double-throw switches, where the second switch is located adjacent to the first switch. Each of the double circuit breakers includes a housing and a switch arm corresponding to each protective circuit extending outside the housing for manually resetting the protective circuit. The system may also include a second linking bar mechanically coupled between one of the switch arms of one of the double circuit breakers and one of the switch arms of an adjacent double circuit breaker.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 4 is a schematic illustration of the interconnections between one double-pole, double throw switch and one double circuit breaker from the switching device of FIG. 2, wherein FIG. 4a illustrates one embodiment in which separate conductors are provided to each protective circuit in the double breaker and FIG. 4b illustrates another embodiment in which a single conductor is provided to both protective circuits in the double breaker.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Figure 2:
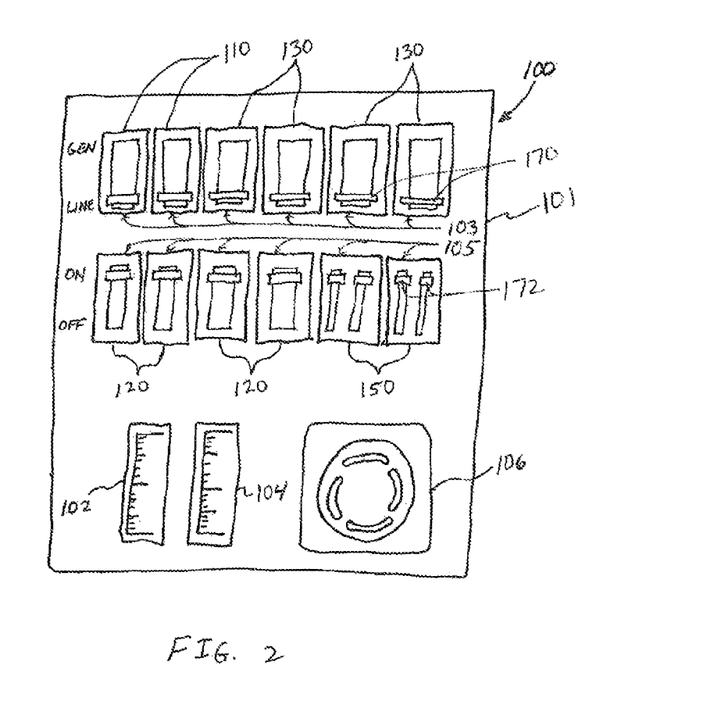
FIG. 2 is a block diagram representation of a switching device according to one embodiment of the invention.

Turning initially to FIG. 2, a switching device 100 in accordance with the present invention is configured to selectively connect electrical loads to one of two power sources. According to the illustrated embodiment, the switching device 100 includes a housing 101 having multiple openings on a surface of the housing 101. The openings may be arranged in multiple configurations. According to the illustrated embodiment, a first series of openings 103 are arranged in a row and configured to receive a switch. Each of the openings 103 in the first row has the same periphery as the other openings 103 in the row. A second series of openings 105 is arranged in a second row and configured to receive a circuit breaker. Each of the openings 105 in the second row has the same periphery as the other openings 105 in the row. Each of the openings 103 in the first row includes a corresponding opening 105 in the second row.

The openings 103 in the first row may receive a single-pole, double throw (SPDT) switch 110 or a double-pole, double-throw (DPDT) switch 130. The illustrated embodiment includes two single-pole, double throw (SPDT) switches 110 and four double-pole, double-throw (DPDT) switches 130. It is contemplated that the switching device 100 will include at least one DPDT switch 130; however, various other numbers and combinations of SPDT switches 110 and DPDT switches 130 may be included without deviating from the scope of the invention. A switch arm 170 is provided to manually transition the switch 130 from a first position in which a circuit is connected to a first power source, such as the utility grid, and a second position in which the circuit is connected to a second power source, such as a backup generator.

The openings 105 in the second row may receive a single circuit breaker 120 or a double circuit breaker 150. The illustrated embodiment shows four single circuit breakers 120 and two double circuit breakers 150. It is contemplated that the switching device 100 will include at least one double circuit breaker 150; however, various other numbers and combinations of single circuit breakers 120 and double circuit breakers 150 may be included without deviating from the scope of the invention. A switch arm 172 is provided to manually open and/or close each protective circuit. If a current conducted through the protective circuit exceeds a predefined amplitude causing the protective circuit to open, the switch arm 172 may be used to manually reset (i.e., close) the protective circuit.

A receptacle 106 is included to receive a plug from a generator, where the plug is connected to a cable including a plurality of power leads extending between the generator and the switching device 100. The receptacle 106 and plug configuration allows the cable to be removably connected to the switching device 100. Optionally, a power cable may be run from the generator to the switching device 100 which includes, for example, a "pig-tail" end having lugs, ferrules, or any other suitable connector attached to each of the conductors in the cable, which is, in turn, securely connected within the switching device 100. The switching device 100 may further include one or more watt meters to provide a visual indication of the power being drawn by loads connected to the generator. As illustrated, a first watt meter 102 and a second watt meter 104 are included. Each may be connected, for example, to one power lead, L1 or L2, in a split power system.

Figure 3:
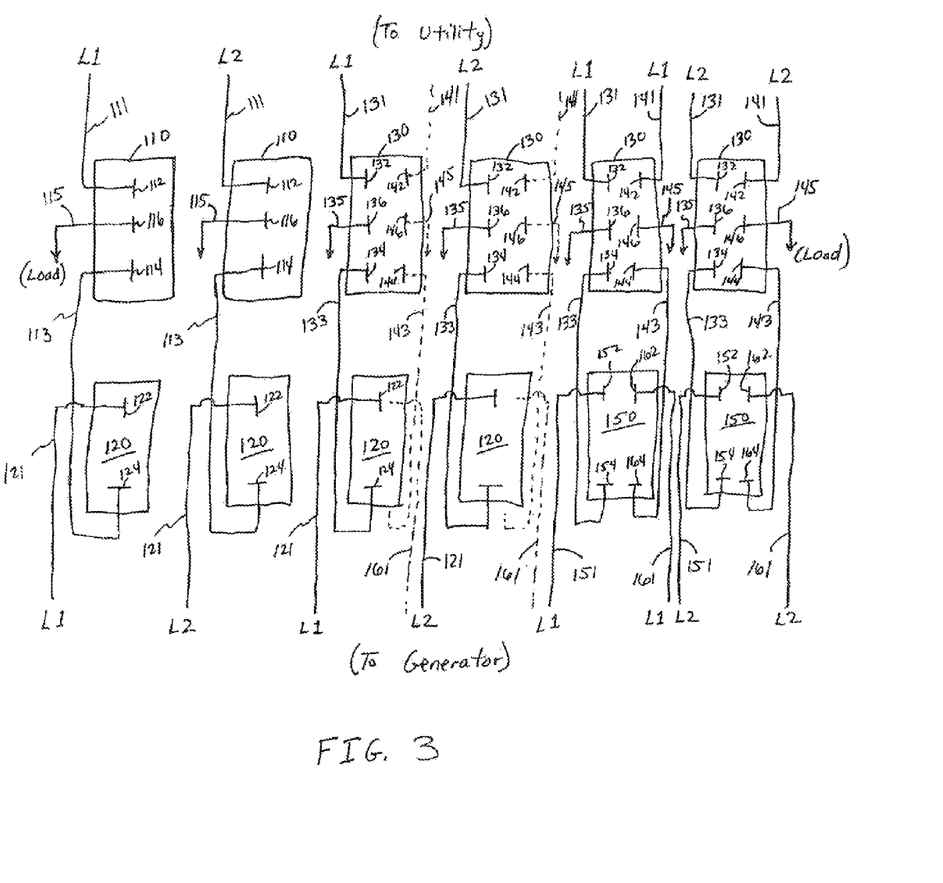
FIG. 3 is a schematic illustration of the switching device of FIG. 2.

Turning next to FIG. 3, an exemplary schematic connection of the transfer switches 110, 130 and breakers 120, 150 is illustrated. According to the illustrated embodiment, the transfer switches 110, 130 and breakers 120, 150 are arranged in three different configurations. The first configuration of transfer switches and breakers includes a SPDT switch 110 and a single breaker 120. A first input connection 112 on the SPDT switch 110 is configured to receive a first electrical conductor 111 carrying power from L1 or L2 of the utility power source. The second input connection 114 on the SPDT switch 110 is configured to receive a second electrical conductor 113 which is connected between the SPDT switch 110 and an output connection 124 of the protective circuit of the single circuit breaker 120. A third electrical conductor 121 carries power from L1 or L2 of the generator to an input connection 122 of the protective circuit of the single breaker 120. The output connection 116 of the SPDT switch 110 is configured to receive an electrical conductor 115 which carries the power from either the utility power source or the generator to the load.

The second configuration of transfer switches and breakers includes a DPDT switch 130 and a single breaker 120. A first input connection 132 on the DPDT switch 130 is configured to receive a first electrical conductor 131 carrying power from L1 or L2 of the utility power source. A second input connection 134 on the DPDT switch 130 is configured to receive a second electrical conductor 133 which is connected between the DPDT switch 130 and an output connection 124 of the protective circuit of the single circuit breaker 120. A third electrical conductor 121 carries power from L1 or L2 of the generator to an input connection 122 of the protective circuit of the single breaker 120. The first output connection 136 of the DPDT switch 130 is configured to receive a first output electrical conductor 135 which carries the power from either the utility power source or the generator to the load.

The second configuration of transfer switches and breakers may also include additional wiring for future expansion of the switching device 100. A third input connection 142 on the DPDT switch 130 is configured to receive a fourth electrical conductor 141 which may be connected to L1 or L2 of the utility power source. A fourth input connection 144 on the DPDT switch 130 is configured to receive a fifth electrical conductor 143 which is configured to be connected between the DPDT switch 130 and an output connection of a second protective circuit when the single circuit breaker 120 is replaced with a double circuit breaker 150. The second output connection 146 of the DPDT switch 130 is configured to receive an additional output electrical conductor 145 which may be connected to an additional load.

Figure 4:
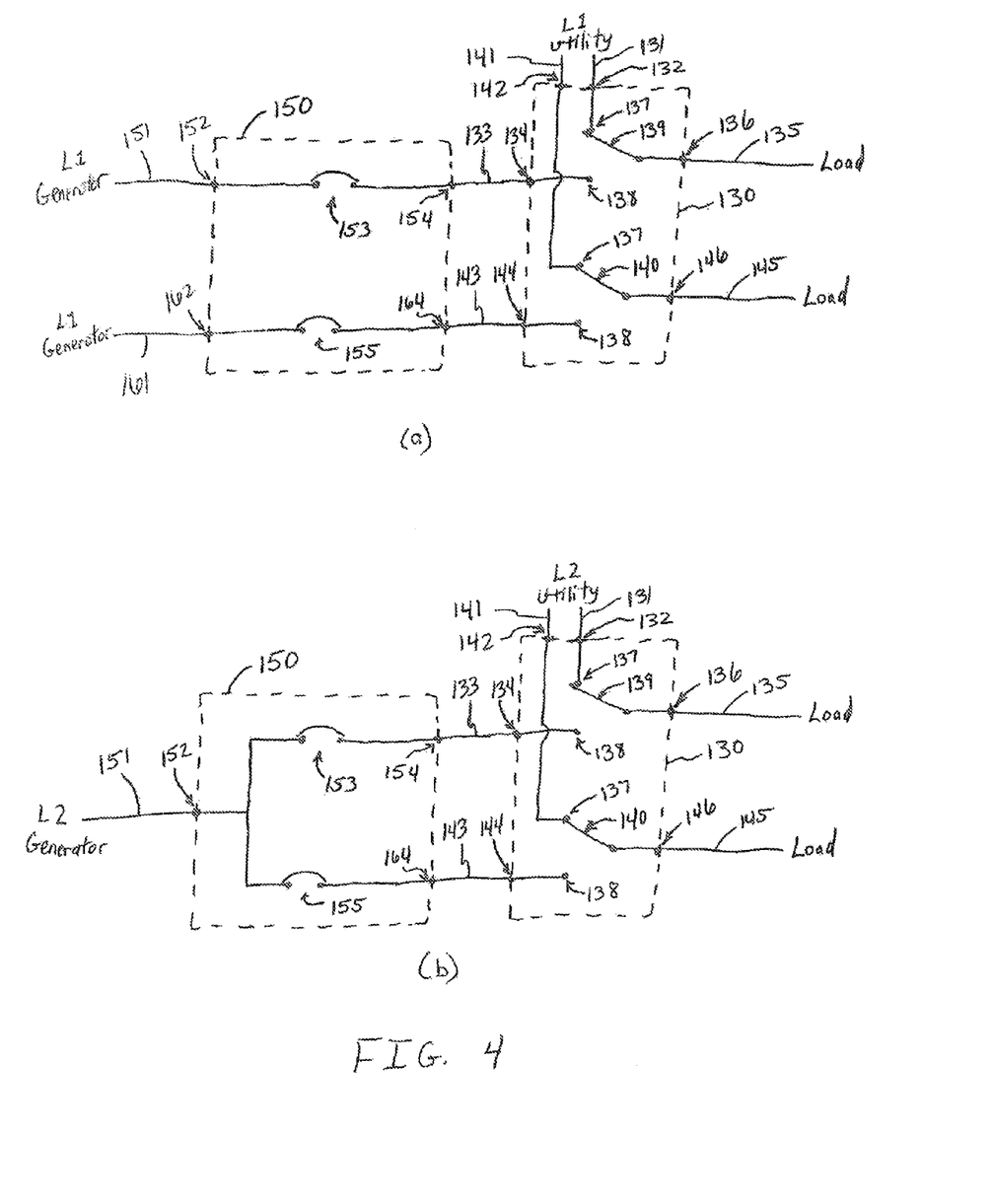

The third configuration of transfer switches and breakers includes a DPDT switch 130 and a double breaker 150. With reference also to FIG. 4, a first input connection 132 on the DPDT switch 130 is configured to receive a first electrical conductor 131 carrying power from L1 or L2 of the utility power source. A second input connection 134 on the DPDT switch 130 is configured to receive a second electrical conductor 133 which is connected between the DPDT switch 130 and an output connection 154 of the first protective circuit of the double circuit breaker 150. A third electrical conductor 151 carries power from L1 or L2 of the generator to an input connection 152 of the first protective circuit 153 of the double circuit breaker 150. The first output connection 136 of the DPDT switch 130 is configured to receive an electrical conductor 135 which carries the power from either the utility power source or the generator to the load. A third input connection 142 on the DPDT switch 130 is configured to receive a fourth electrical conductor 141 carrying power from L1 or L2 of the utility power source. Optionally, the DPDT switch may have an internal electrical connection between the first input connection 132 and the third input connection 142 and a single electrical conductor 131 carrying power from L1 or L2 of the utility power source. A fourth input connection 144 on the DPDT switch 130 is configured to receive a fifth electrical conductor 143 which is connected between the DPDT switch 130 and an output connection 164 of the second protective circuit of the double circuit breaker 150. A sixth electrical conductor 161 carries power from L1 or L2 of the generator to an input connection 162 of the second protective circuit 155 of the double circuit breaker 150. Optionally, as shown in FIG. 4b, the double circuit breaker 150 may have an internal electrical connection between the two input connections 152, 162 and a single electrical conductor 151 may be used to carry power from L1 or L2 of the generator. The second output connection 146 of the DPDT switch 130 is configured to receive an additional output electrical conductor 145 which carries the power from either the utility or the generator to an additional load.

In operation, the switching device 100 selectively connects an electrical load to one of two power sources. The switching device 100 may be configured to hold various numbers of pairs of transfer switches and breakers. The illustrated embodiment shows six (6) pairs; however, it is contemplated that various other numbers of paired devices may be included, such as eight (8), ten (10), or twelve (12) without deviating from the scope of the invention. Each of the leftmost pairs of transfer switches 110 and circuit breakers 120, as illustrated, is configured according to the first configuration discussed above and may be included to provide a reduced cost option for one or more pairs of switches and circuit breakers when all of the pairs are not required to provide a dual connection option. Further, one transfer switch 110 connected to L1 and a second transfer switch 110 connected to L2 may be used in combination to provide 240V to a load, according to application requirements.

Each of the middle two pairs of transfer switches 130 and circuit breakers 120, as illustrated, is configured according to the second configuration discussed above, providing for reduced initial cost of the switching device 100 and easy expansion if future circuits are to be added to the switching device 100. The DPDT switch 130 versus the SPDT switch 110 and the additional electrical conductors 141, 143, and 145 have a marginal additional expense. For expansion, the single circuit breaker 120 is removed and a double circuit breaker 150 is inserted. The wiring to the protective circuit of the single circuit breaker 120 is reconnected to the first protective circuit of the double circuit breaker 150. The additional electrical conductors provided may then be connected between either L1 or L2 of the utility power source and connected to the additional branch circuit.

Each of the rightmost pairs of transfer switches 130 and double circuit breakers 150, as illustrated, are configured according to the third configuration discussed above, providing for additional switching capacity within the same physical size switching device 100. When the DPDT switch is in a first position, each of the first and fourth electrical conductors, 131 and 141 respectively, are connected to the output electrical conductors, 135 and 145. The first electrical conductor 131 is connected to the first pole 137 of the first throw 139, and the fourth electrical conductor 141 is connected to the first pole 137 of the second throw 140. When the DPDT switch is in a second position, each of the second and fifth electrical conductors, 133 and 143 respectively, are connected to the output electrical conductors, 135 and 145. The second electrical conductor 133 is connected to the second pole 138 of the first throw 139, and the fifth electrical conductor 143 is connected to the second pole 138 of the second throw 140. The first throw 139 is connected to the first output connection 136 and, in turn, to the electrical conductor 135 to one of the loads, and the second throw 140 is connected to the second output connection 146 and, in turn, to the electrical conductor 145 to another load.

The double circuit breaker 150 is connected, for example, to a single stake on a bus bar internal to the switching device. The bus bar is, in turn, connected via the third electrical conductor 151 to either L1 or L2 of the generator. Thus, a single switch arm on the DPDT switch 130 may be used to alternately connect two branch circuits either to the utility power source or to the generator in the same physical space that the SPDT switch 110 and the single breaker 120 require for alternately connecting one branch circuit either to the utility power source or to the generator.

According to another aspect of the invention, two adjacent DPDT switches 130 may be configured to switch two single pole circuits and one double pole circuit in tandem. A linking bar may be provided across the switch arms 170 of two adjacent DPDT switches 130 and a linking bar may similarly be provided across the inner two switch arms 172 of the double breakers 150. Optionally, a quad breaker (not shown) may replace two double breakers in which the quad breaker includes a double pole protection circuit and two single pole protection circuits. The double pole circuit may be used, for example, in a distribution system to selectively connect L1 from one of the power sources on one pole and to selectively connect L2 from the power source on the other pole in order to provide 240V to a load such as a clothes dryer. Each of the single pole circuits may selectively connect either L1 or L2 from the power source in order to provide 120 V to other branch circuits in the residence.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A switching device for selectively connecting a plurality of load circuits between a first power source and a second power source, the switching device comprising:
    at least one double pole, double throw switch wherein each throw selectively connects one of the load circuits with the first power source in a first position and with the second power source in a second position; and
    at least one double breaker, each double breaker corresponding to one of the double pole, double throw switches, wherein:
    the double breaker includes a first protective circuit and a second protective circuit, each protective circuit is configured to operate independently of the other protective circuit, each protective circuit is configured to open if a current conducted through the protective circuit exceeds a predefined amplitude, and the double breaker is sized to fit within an opening configured to receive a single breaker.

2. The switching device of claim 1, further comprising:

at least one additional double pole, double throw switch wherein one throw selectively connects one of the load circuits with the first power source in a first position and with the second power source in a second position and wherein the second throw is not connected; and at least one single breaker, each single breaker corresponding to one of the additional double pole, double throw switches, wherein the single breaker includes a protective circuit configured to open if a current conducted through the protective circuit exceeds a predefined amplitude and the single breaker is sized to fit within a second opening configured to receive either the single breaker or the double breaker.

3. The switching device of claim 1 wherein the first power source is a utility grid and the second power source is a backup generator.

4. The switching device of claim 3 wherein the utility grid includes a first hot lead, a second hot lead, and a neutral lead, and wherein the generator includes a first hot lead, a second hot lead, and a neutral lead.

5. The switching device of claim 4 wherein each of the double-pole, double-throw switches and the corresponding double circuit breaker are configured to selectively connect one of a plurality of outputs between one of the first hot lead and the second hot lead of the utility grid and the generator.

6. A switching device, comprising:

a first input configured to be electrically connected to a first power source;

a second input configured to be electrically connected to a second power source;

a plurality of outputs, each output configured to be electrically connected to an electrical load;

a plurality of double-pole, double-throw switches, wherein a first pole for each throw is electrically connected to the first input, a second pole for each throw is electrically connected to the second input, and each throw is electrically connected to one of the plurality of outputs;

a plurality of circuit breakers, wherein each of the circuit breakers corresponds to one of the plurality of double-pole, double-throw switches, each circuit breaker including:

a first terminal electrically connected to the second power source, a second terminal electrically connected to the second pole for a first throw of the corresponding double-pole, double-throw switch, a third terminal electrically connected to the second pole for a second throw of the corresponding double-pole, double-throw switch, a first protective circuit electrically connected in series between the first terminal and the second terminal, and a second protective circuit electrically connected in series between the first terminal and the third terminal.

7. The switching device of claim 6 further comprising at least one additional circuit breaker wherein each of the plurality of circuit breakers includes a first housing and wherein the additional circuit breaker includes a single protective circuit and a second housing substantially the same size as the first housing.

8. The switching device of claim 6 wherein each protective circuit is normally closed and wherein each protective circuit opens when a current conducted through the protective circuit exceeds a predefined level.

9. The switching device of claim 8 wherein each of the circuit breakers further includes a manual reset for each of the protective circuits, wherein the manual reset may be externally activated to close the protective circuit.

10. A system for providing power to an electrical load during a failure of a utility grid, the system comprising:

a housing including a plurality of first openings and a plurality of second openings, wherein each of the plurality of first openings has a uniform periphery and is configured to receive one of a single-pole, double-throw switch and a double-pole, double-throw switch and wherein each of the plurality of second openings has a uniform periphery and is configured to receive one of a single circuit breaker and a double circuit breaker;

a first input configured to be connected to the utility grid;

a second input configured to be connected to another power source;

a plurality of outputs, each output configured to be connected to an electrical load;

a plurality of double-pole, double-throw switches, wherein each of the double-pole, double-throw switches is received within one of the plurality of first openings and is configured to selectively establish a first electrical connection between one of the first input and the second input and one of the plurality of outputs via a first throw and to selectively establish a second electrical connection between one of the first input and the second input and one of the plurality of outputs via a second throw; and a plurality of double circuit breakers, each double circuit breaker corresponding to one of the plurality of double-pole, double-throw switches, wherein each of the double circuit breakers is received within one of the plurality of second openings and includes a first protective circuit electrically connected between the second input and the first throw of the corresponding double-pole, double-throw switch and a second protective circuit electrically connected between the second input and the second throw of the corresponding double-pole, double-throw switch.

11. The system of claim 10 wherein the another power source is a backup generator.

12. The system of claim 11 wherein the utility grid includes a first hot lead, a second hot lead, and a neutral lead, and wherein the backup generator includes a first hot lead, a second hot lead, and a neutral lead.

13. The system of claim 12 wherein each of the double-pole, double-throw switches and the corresponding double circuit breaker are configured to selectively connect one of the plurality of outputs between one of the first hot lead and the second hot lead of the utility grid and the backup generator.

14. The system of claim 12 wherein each of the double-pole, double-throw switches includes a housing and a switch arm extending outside the housing, wherein the switch arm moves each throw between a first position and a second position.

15. The system of claim 14 further comprising a linking bar mechanically coupled between a first switch arm of a first of the double-pole, double-throw switches and a second switch arm of a second of the double-pole, double-throw switches the second double-pole, double-throw switch located adjacent the first double-pole, double-throw switch.

16. The system of claim 15 wherein each of the double circuit breakers includes a housing and a switch arm corresponding to each protective circuit extending outside the housing for manually resetting the protective circuit.

17. The system of claim 16 further comprising a second linking bar mechanically coupled between one of the switch arms of one of the double circuit breakers and one of the switch arms of an adjacent double circuit breaker.

18. The system of claim 10 wherein at least one of the plurality of double-pole, double-throw switches is configured to establish only a single electrical connection between one of the first input and the second input to one of the plurality of outputs via one of the throws and the other of the throws is not connected.

19. A method for configuring a switching device for selectively connecting a first load circuit and a second load circuit between a first power source and a second power source, wherein the switching device includes a double pole, double throw switch and a single circuit breaker, the method comprising the steps of:
    removing the single circuit breaker from an opening in the switching device;
    inserting a double circuit breaker in the opening in the switching device;
    connecting a first electrical conductor between a first pole of a first throw for the double pole, double throw switch and a first protective circuit in the double circuit breaker;
    connecting a second electrical conductor between a first pole of a second throw for the double pole, double throw switch to a second protective circuit in the double circuit breaker; and
    connecting the second load circuit to the second throw of the double pole, double throw switch.

20. The method of claim 19 further comprising the steps of:
    connecting the first power source to a second pole of the second throw for the double pole, double throw switch;
    connecting the second power source to each of the first and the second protective circuits;
    moving the first throw and the second throw of the double pole, double throw switch in tandem to a first position to connect the first load circuit and the second load circuit to the first power source; and
    moving the first throw and the second throw of the double pole, double throw switch in tandem to a second position to connect the first load circuit and the second load circuit to the second power source via the double breaker.

21. The method of claim 19 wherein each of the first and the second electrical conductors are provided with the switching device.

22. The method of claim 21 wherein a third electrical conductor is provided with the switching device to connect the second load circuit to the second throw and a fourth electrical conductor is provided with the switching device to connect the first power source to the second pole of the second throw.

23. The method of claim 19 wherein each protective circuit is normally closed, further comprising the steps of:
    monitoring a magnitude of current conducted in the first protective circuit;
    opening the first protective circuit when the magnitude of current exceeds a predefined level;
    monitoring a magnitude of current conducted in the second protective circuit; and
    opening the second protective circuit when the magnitude of current exceeds the predefined level.

* * * * *